US008451917B2

(12) United States Patent
Rao et al.

(10) Patent No.: US 8,451,917 B2
(45) Date of Patent: May 28, 2013

(54) METHOD AND APPARATUS FOR DETECTION OF ORTHOGONAL FREQUENCY DIVISION MULTIPLEXING (OFDM) SIGNALS BY COGNITIVE RADIOS

(75) Inventors: Yadunandana N. Rao, Sunrise, FL (US); Apoorv Chaudhri, Sunrise, FL (US); Robert J. Corke, Glen Ellyn, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1122 days.

(21) Appl. No.: 12/165,597

(22) Filed: Jun. 30, 2008

(65) Prior Publication Data

US 2009/0323835 A1   Dec. 31, 2009

(51) Int. Cl.
*H04K 1/10* (2006.01)
(52) U.S. Cl.
USPC .......................................... 375/260; 375/346
(58) Field of Classification Search
USPC ..................... 375/316–352; 455/434, 1, 448
See application file for complete search history.

(56) References Cited

U.S. PATENT DOCUMENTS

| 5,669,386 | A  | * | 9/1997  | Thiele et al. ............... | 600/454 |
| 6,067,319 | A  | * | 5/2000  | Copeland .................... | 375/232 |
| 6,459,727 | B1 | * | 10/2002 | Cho et al. ................... | 375/222 |
| 7,852,821 | B2 |   | 12/2010 | Hyon et al. | |
| 2007/0157269 | A1 | * | 7/2007 | Visotsky et al. ............ | 725/100 |
| 2008/0014880 | A1 |   | 1/2008 | Hyon et al. | |
| 2010/0119016 | A1 | * | 5/2010 | Ghosh ......................... | 375/340 |

FOREIGN PATENT DOCUMENTS

| KR | 10-2008-0007047 A | 1/2008 |
| WO | WO 2008108797 A1 * | 9/2008 |

OTHER PUBLICATIONS

PCT/US2009/047874—International Search Report with Written Opinion mailed Jan. 21, 2010—11 pages.
Anuj Batra et al "Multi-band OFDN: a Cognitive Radio for UWB" In ISCAS 2006, IEEE 2006—pp. 4094-4097.
Bölcskei, H., "Blind Estimation of Symbol Timing and Carrier Frequency Offset in Wireless OFDM Systems," IEEE Transactions on Communications, vol. 49, No. 6, Jun. 2001, pp. 988-999.
Heath Jr., R. W., and Giannakis, G.B., et al., "Exploiting Input Cyclostationarity for Blind Channel Identification in OFDM Systems," IEEE Transactions on Signal Processing, vol. 47, No. 3, Mar. 1999, pp. 848-856.
Tang, H., "Some Physical Layer Issues of Wide-band Cognitive Radio Systems," First IEEE International Symposium on New Frontiers in Dynamic Spectrum Access Networks, DySPAN 2005, pp. 151-159.
Yeung, G. K., and Gardner, W. A., "Search-Efficient Methods of Detection of Cyclostationary Signals," IEEE Transactions on Signal Processing, vol. 44, No. 5 1996, pp. 1214-1223.

(Continued)

*Primary Examiner* — Sam K Ahn
*Assistant Examiner* — Janice Tieu
(74) *Attorney, Agent, or Firm* — Barbara R. Doutre (57) ABSTRACT

Efficient frequency spectrum sharing between at least one incumbent communication system(s) (102, 104) and at least one cognitive radio (CR) system (106, 108) is provided. The CR unit includes OFDM detection (216) for detecting the presence of OFDM signals which indicate the presence of an incumbent communication system within the shared spectrum. The CR system (106) updates channel occupancy information in response to the detected OFDM signals so as not to interfere with the incumbent communication systems (102, 104).

20 Claims, 7 Drawing Sheets

OTHER PUBLICATIONS

Yip, K. -W., et al., "Timing—Synchronization Analysis for IEEE 802.11a Wireless LANs in Frequency-Nonselective Rician Fading Environments," IEEE Transactions on Wireless Communications, vol. 3, No. 2, Mar. 2004, pp. 387-394.

English Translation of Office Action for counterpart Korean Patent Application No. 10-2010-7029589 mailed on Feb. 8, 2012.
International Preliminary report on Patentability for counterpart International Application No. PCT/US2009/047874 issued on Jan. 5, 2011.

* cited by examiner

METHOD AND APPARATUS FOR DETECTION OF ORTHOGONAL FREQUENCY DIVISION MULTIPLEXING (OFDM) SIGNALS BY COGNITIVE RADIOS

FIELD OF THE DISCLOSURE

The present invention relates generally to communication systems and more particularly to facilitating the coexistence of cognitive radio systems with incumbent communication systems and other cognitive radio systems.

BACKGROUND

In the wireless communications arena, an incumbent user is generally defined as any existing user of frequency spectrum. Cognitive radio is a paradigm for wireless communication in which either a network or a wireless node changes its transmission or reception parameters to communicate efficiently and utilize spectrum on a secondary basis without interfering with the incumbent users of a frequency band. This alteration of parameters is based on the active monitoring of several factors in the external and internal radio environment, such as radio frequency spectrum usage, user behavior and network state.

With the advent of cognitive radio networks and opportunistic spectrum access, the problem of accurate detection and classification of primary licensed users has taken utmost importance. The IEEE 802.22 standard allows unlicensed secondary wireless devices to operate in the TV white space but requires that there be minimum or no interference to the primary incumbents. Thus, CR devices must also sense for the existence of 802.22 based devices within the spectrum.

Accordingly, there is need to facilitate the ability of CR devices to sense for the existence of incumbent devices and/or other CR devices so as to avoid interference.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components for sensing the presence of an incumbent system via the detection of orthogonal frequency division multiplexing (OFDM) signals in noise. For the purposes of this application, the term "incumbent system" is defined as a communication system having known information about existing operating parameters that is allowed to operate in the band. An incumbent system may be a primary or secondary licensed user of a band, or an incumbent user may be any pre-existing user of a band. For example, TV broadcasters are considered as the licensed primary incumbent users of the television bands, and certain wireless microphones are considered as the licensed secondary incumbent users of the television bands. Unlicensed opportunistic users, such as other 802.22 CR devices or systems can also be considered as incumbent users of the spectrum.

Orthogonal frequency division multiplexing (OFDM) provides a modulation technique for transmitting large amounts of digital data over an RF channel. OFDM works by splitting the radio signal into multiple smaller sub-signals that are then transmitted simultaneously at different frequencies to a receiver. The use of OFDM reduces the mount of crosstalk in signal transmissions. Technologies such as 802.11a, WLAN, 802.16 and WiMAX utilize OFDM. An incumbent system operating in accordance with 802.11/22 standards use some form of OFDM based modulation in the physical (PHY) layer. In accordance with various embodiments of the invention, the detection of OFDM signals by the CR system, in a manner to be described herein, facilitates the operation and co-existence of CR systems within the incumbent systems' operating band.

The detection of OFDM signals by CR communication units, as will be described herein, effectively extends or reduces interference levels to the incumbent communication system and promotes the efficient sharing of frequency spectrum. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions involved in detecting an OFDM signal in noise to avoid interference between the incumbent system and the cognitive system. The non-processor circuits may include, but are not limited to, a radio receiver, a radio transmitter, signal drivers, clock circuits, power source circuits, and user input devices. As such, these functions may be interpreted as steps of a method for communication systems to share spectrum. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Briefly, in accordance with the invention, there is provided herein an OFDM signal detection apparatus and technique for use by a cognitive radio (CR) communication system to detect an incumbent system or other CR system. The CR communication system is made up of a plurality of CR communication units which comprise at least one CR base station and at least one CR subscriber. Either one or both of the CR base and/or the CR subscriber may contain the OFDM detection engine. Typically, the CR base station maintains a list of channels within which it seeks to share spectrum with incumbent systems (or other CR systems), for example based on geo-location. One or more CR units senses one or more channels from this list and generate sensing results. The initial detector configuration vector is used to configure an internal OFDM detector as part of a detection engine. The detection engine may be run within the CR base station(s) and/or the CR subscriber(s) to detect for the presence or absence of one or more OFDM signals. The presence of an OFDM signal indicates that an incumbent unit is operating within the spectrum and is to be avoided. The detected incumbent can be further monitored to determine whether the sensing CR device(s) can join the incumbent system or whether the sensing CR device(s) can override the incumbent system. The absence of an OFDM signal indicates that the CR system may utilize the spectrum. The results of OFDM detection along with detector configuration vector are used to update channel occupancy information and configuration vector within the CR unit(s) for future use. Once the CR unit(s) characterizes the incumbent system, CR system operation within the incumbent's spectrum can begin. The OFDM detection approach greatly alleviates the incumbent system's interference concerns, and facilitates the adoption of CR system operation within incumbent system frequency spectrum.

Figure 1:
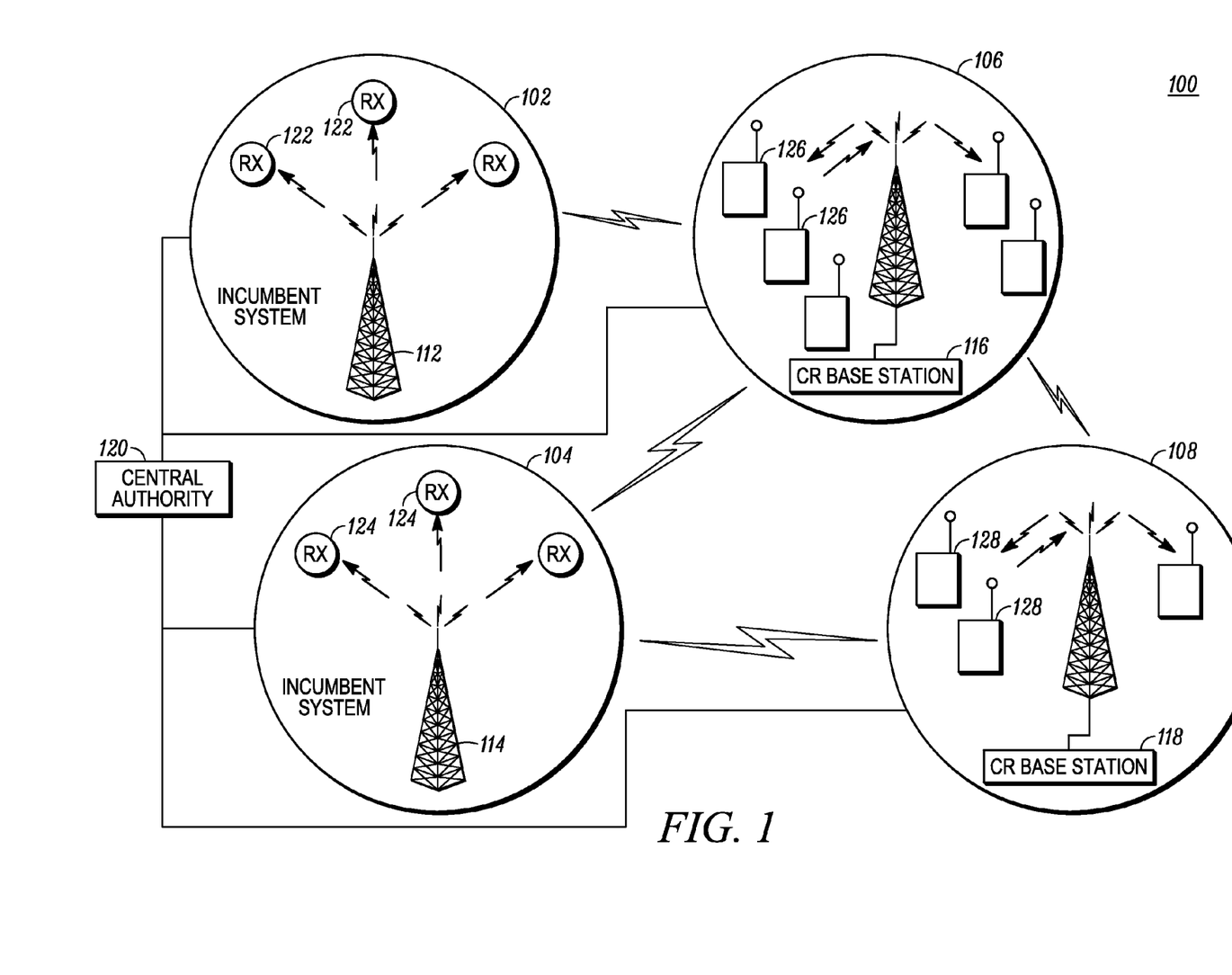
FIG. 1 illustrates a network diagram of incumbent communication systems and cognitive communication systems co-existing in accordance with some embodiments of the invention.

FIG. 1 illustrates incumbent and cognitive communication systems co-existing in accordance with some embodiments of the present invention. In accordance with these embodiments, cognitive radio systems 106, 108 efficiently share frequency spectrum with the one or more incumbent communication systems 102, 104 without interfering with the incumbent systems. The various embodiments of the invention allow CR communication system 106, for example, to share spectrum with incumbent systems 102, 104 and CR communication system 108.

Incumbent communication systems 102, 104 each include a main transmitter 112, 114 respectively and a plurality of receiving devices 122, 144 respectively. CR system 106 includes a CR base station 116 and a plurality of CR subscribers 126 in the form of transceiver devices. Cognitive radio system 108 includes a CR base station 118 and a plurality of CR subscribers 128 also in the form of transceiver devices. The incumbent communication systems 102, 104 and CR communication systems operate under the governance of a central authority 120. Examples of the central authority include any Official, Federal, or Regional Regulatory or management body, such as the FCC or other officially designated bodies.

Figure 2:
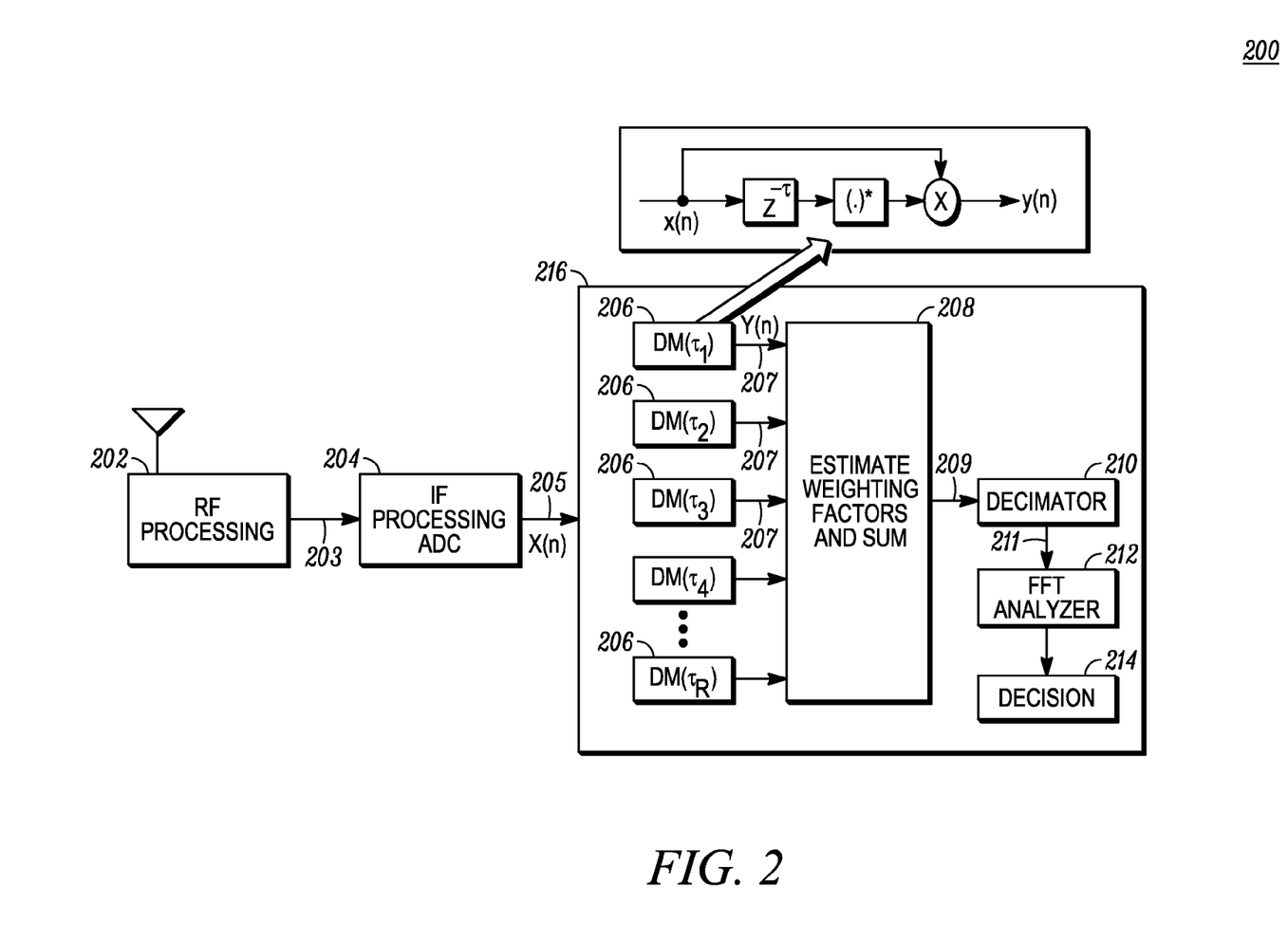
FIG. 2 illustrates a block diagram of a cognitive radio (CR) communication unit having an orthogonal frequency division multiplexing (OFDM) detection module formed and operating in accordance with some embodiments of the invention.

FIG. 2 a block diagram of a CR communication unit formed in accordance with some embodiments of the invention. The CR communication unit block diagram is applicable to the base station 116 and/or the CR subscriber 126, depending on how the system is configured.

Within CR communication unit 200, there is found an RF processing section 202 for receiving an RF signal and converting it via known signal processing techniques to an IF signal 203. The IF signal 203 is processed via known IF processing circuits at IF processing block 204 which includes an analog to digital converter (ADC) to generate a digital baseband signal X(n) 205 which is presented to an OFDM detection module 216. In accordance with embodiments of the invention, OFDM detection module 216 includes a plurality of configurable delay multipliers 206 ($DM(t_R)$). Each delay multiplier 206 takes the digital baseband signal 205 and applies a time delay followed by a complex conjugate transformation. Each delay multiplier 206 then generates an output signal which is the product of the incoming digital signal and the time-delayed complex conjugate version of the same. The bank of delay multiplier units thereby generate multiple data stream 207 Y(n). The multiple lags (−tau) provided by the bank of delay multipliers 206 are simultaneously applied to the same digital baseband signal 205 X(n).

The delay multipliers 206 operate by applying one or more lags (−tau) depending on the channel being sensed. Lags are functions of the OFDM frame structure and are selected based on apriori information regarding the incumbent unit, such as incumbent unit 122 or 124. In cases when the underlying protocol of the incumbent is completely unknown (unknown OFDM frame structure), a simple search could be employed to determine the appropriate lag.

The multiple data streams 207 Y(n) are applied to a combiner 208 which in turn applies scaling to each stream. The scaling can be in the form of predetermined weighting factors, for example attenuation and amplification factors, or the scale factors can be adaptively estimated and simultaneously applied to the incoming multiple data streams. Combiner 208 sums the weighted signals to generate a single data stream 209. The converged scaling factors or coefficients can be reused by other local subscribers or the same subscriber. The base station 116 determines the number of incumbent OFDM signals using the estimated scaling coefficients.

If there is uncertainty in the selection of time delay, multiple DM circuits can be enabled based on the detector configuration vector. Fixed scaling factors can potentially degrade detection performance due to increased noise. According to one embodiment of the invention, the combiner output can be represented as $$z(t) = \sum_{\tau} \alpha(\tau) x(t) x^*(t - \tau)$$

where, x(t) is the complex baseband signal and $\alpha=[\alpha(\tau_1), \alpha(\tau_2), \alpha(\tau_3) \ldots, \alpha(\tau_M)]$ denotes a vector of scaling coefficients, where each $\alpha$ is given by, $$\alpha(\tau_k) = |E\{x(t)x^*(t-\tau_k)\}|$$

In the above expression, E{.} represents the statistical expectation operator which can be approximated by an arithmetic sum. With the above definition of scaling, the output from every DM branch is scaled according to the estimated autocorrelation at a particular time delay. Since noise is uncorrelated, the scaling coefficients of DM branches with no incumbent activity will converge asymptotically to zero. The same argument holds good for other interference signals that possess different cyclostationary characteristics than the incumbent signal.

The single data stream 209, a high rate data signal, is applied to a decimator 210 to generate decimated signal 211. The decimator 210 slows down the high data rate stream 209 by a predetermined factor (for example a factor of 16) which provides current savings to the CR unit. The lower rate data stream of decimated signal 211 is provided to a Fast Fourier Transform (FFT) Analyzer 212 to generate a spectral output 213. A decision block 214, implemented with logic, receives the spectrum output 213 and determines whether any of the spectral features indicate the presence of one or more OFDM signals.

Referring back to FIG. 1, in operation, CR base station 116 receives, or has pre-stored therein, a list of channels to be sensed. The sensing channel list is a list of possible incumbent channels open for secondary/cognitive use. The origination of the channel list may occur from central authority 120 or other databases. The CR base station 116 provides the channel list and detector configuration data to CR subscriber unit(s) 126. The CR subscriber unit(s) 126 utilizes the channel list and detector configuration vector data to configure internal OFDM detector engine 200 located within the subscriber 126. The subscriber's detection engine is run to determine the presence or absence of an OFDM signal.

The presence of an OFDM signal indicates that an incumbent unit is operating within the spectrum. CR base station 116 determines whether to override the incumbent, join the incumbent or co-exist with the incumbent perhaps with some performance loss. The absence of an OFDM signal indicates that the spectrum can be used. The CR subscriber unit(s) 126 update the CR base station 116 with the sensing results and updated detector configuration vector. The CR base station 116 receives the sensing results and updated subscriber detector configuration vector and uses this information to update channel occupancy information and to update the base station's detector configuration vector. Information from other CR subscribers 128 and CR base stations 118 running through similar processes can also be provided to base station 116. The updated channel occupancy information of the incumbent system and the bases' updated detector configuration vector is transferred back to the CR subscriber. The CR subscriber 126 and CR base 116 have thus been provided with the characterization of the incumbent system 102 such that CR communication takes place without interference with the incumbent system(s) 102, 104.

Figure 3:
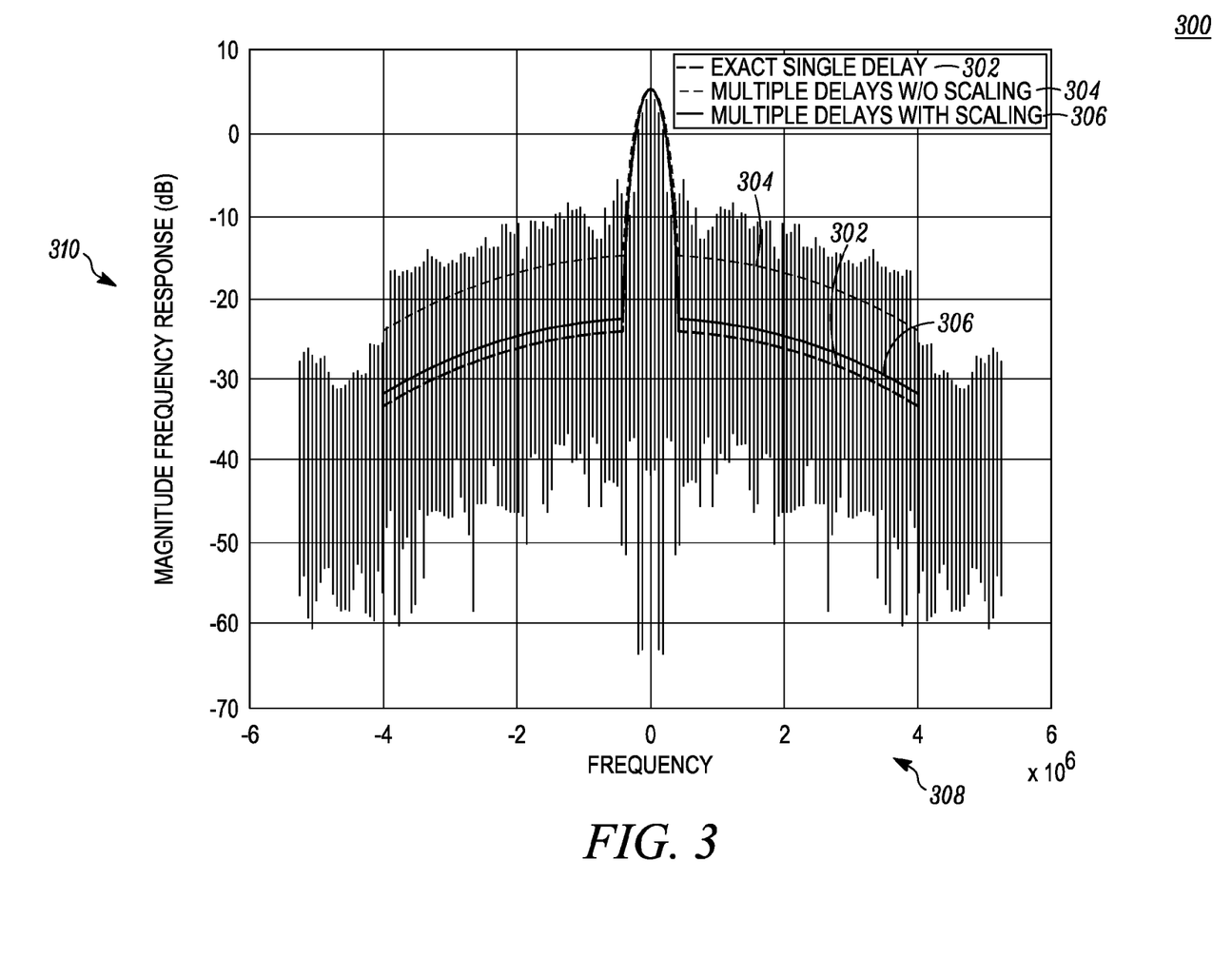
FIG. 3 illustrates a composite signal spectrum comparing outputs of the OFDM detection module of FIG. 2 taken under various delay and scaling conditions in accordance with some embodiments of the invention.

FIG. 3 illustrates a simulated example of a composite signal spectrum in accordance with some embodiments of the invention. Composite signal spectrum 300 compares outputs of the OFDM detection module of FIG. 2 taken under various delay and scaling conditions. The scaling and delay conditions include an exact single delay 302, multiple delays without scaling 304 and multiple delays with scaling signal 306 along a frequency axis 308 and magnitude frequency response (dB) axis 310. Graph 300 shows the smoothed magnitude frequency response with 306 and without 304 adaptive scaling along with the case of single exact delay/lag 302 (as a reference). The response with adaptive scaling 306 as compared to the response without adaptive scaling 304 has a much lower detector noise floor. Thus, the OFDM detection module 216 with adaptive scaling thus provides the benefit of a reduction in noise floor. In general, the appropriate delay parameter (DM circuit parameter) will not be known. However, based on the protocol frame structures a list of probable delay values can be produced. Further, where there is more than one OFDM signal (more than one incumbent) within the same channel, then a single delay is not enough to detect both. One of the issues with having multiple delays is that it can result in an increase in the detector noise which can adversely affect the performance of the multiple delay detectors when compared with a single delay detector. In order to suppress this unwanted noise, an adaptive scaling block is included. The scaling will intelligently suppress those DM outputs that do not have any activity, such as DM outputs corresponding to wrong delay values.

Referring to FIGS. 2 and 3, the detection engine's 216 weighting coefficient estimation block 208 suppresses the noise floor 306. The weighting coefficient estimation block 208 also suppresses correlated interference when cyclic features of unwanted interference are different from that of the signal of interest. A vector of weighting coefficients is estimated from every delay multiplier 206 branch output. The adaptive weights can be used to suppress the unwanted DM outputs. The amount of suppression varies according to the way the weights are estimated. The maximum weight may be the only non-zero weight, for example, in a winner-take-all configuration Referring to FIG. 4, there is shown a general timeline for establishing characterization of an incumbent system by a CR base station and a CR subscriber to enable spectrum sharing in accordance with an embodiment of the present invention. Beginning at the CR base station 116 a list of channels to be sensed and an initial detector configuration vector (comprising lag values, number of DM circuits and weighting coefficients) are transmitted 402 to CR subscriber units 126. Subscriber unit 126 configures its OFDM detector at 404 based on the received configuration vector. The configured subscriber 126 then proceeds to run the detection engine at 406. The detection engine includes the OFDM detector having DM circuit bank, adaptive scaling, FFT analyzer and logic block. The sensing results and updated detector configuration vector are then transmitted 408 back to the CR base station 116. The CR base station 116 also receives 410 sensing results from other neighboring CR subscribers 128. The CR base station 116 updates channel occupancy information at 412 based on the sensing results and detector configuration vector. The CR base station 116 then updates the detector configuration vector at 414 based on the updated channel information. The updated channel information is transmitted 416 back to the CR subscriber 126. The CR subscriber 126 iteratively reconfigures its detector 216 and run the detection engine again. The process of sensing continues periodically irrespective of the presence or absence of the incumbent, as the incumbent can potentially show up anytime. The process of sensing thus provides a continually updated list of usable channels for CR system operation.

Figure 5:
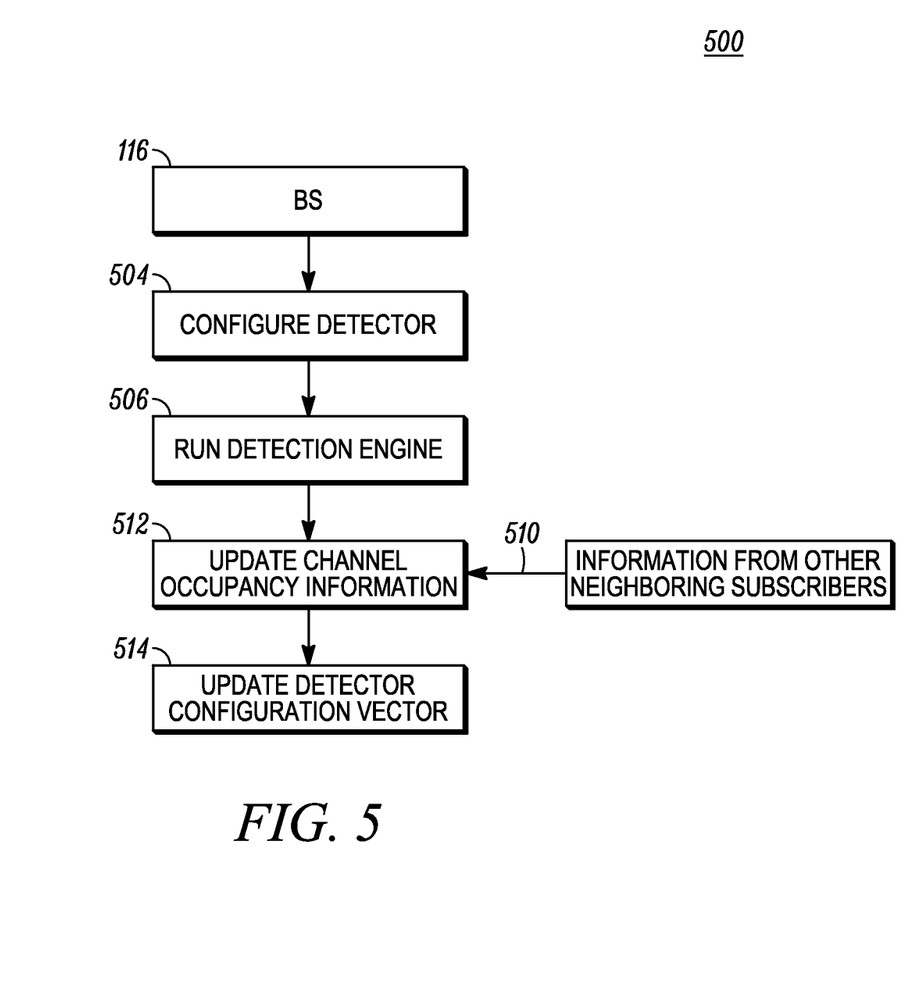
FIG. 5 illustrates a general timeline for establishing characterization of an incumbent system by a CR base station alone (alternatively a mobile subscriber alone) to enable spectrum sharing in accordance with some embodiments of the present invention.

FIG. 5 represents a timeline for the characterization of an incumbent system by the base station 116 alone. Base station 116 configures its own detector 504 and runs its internal detection engine at 506 to detect the presence of OFDM signals in the spectrum. Based on the detection of OFDM signals at 506 along with detection engine information provided 510 by other CR base stations or CR subscribers, the base station 116 updates 514 its channel occupancy information detector configuration vector so as not to interference with any incumbent. Alternatively, in an ad-hoc system a mobile subscriber can carry out steps 504-514 as there is not base station in such systems.

Figure 6:
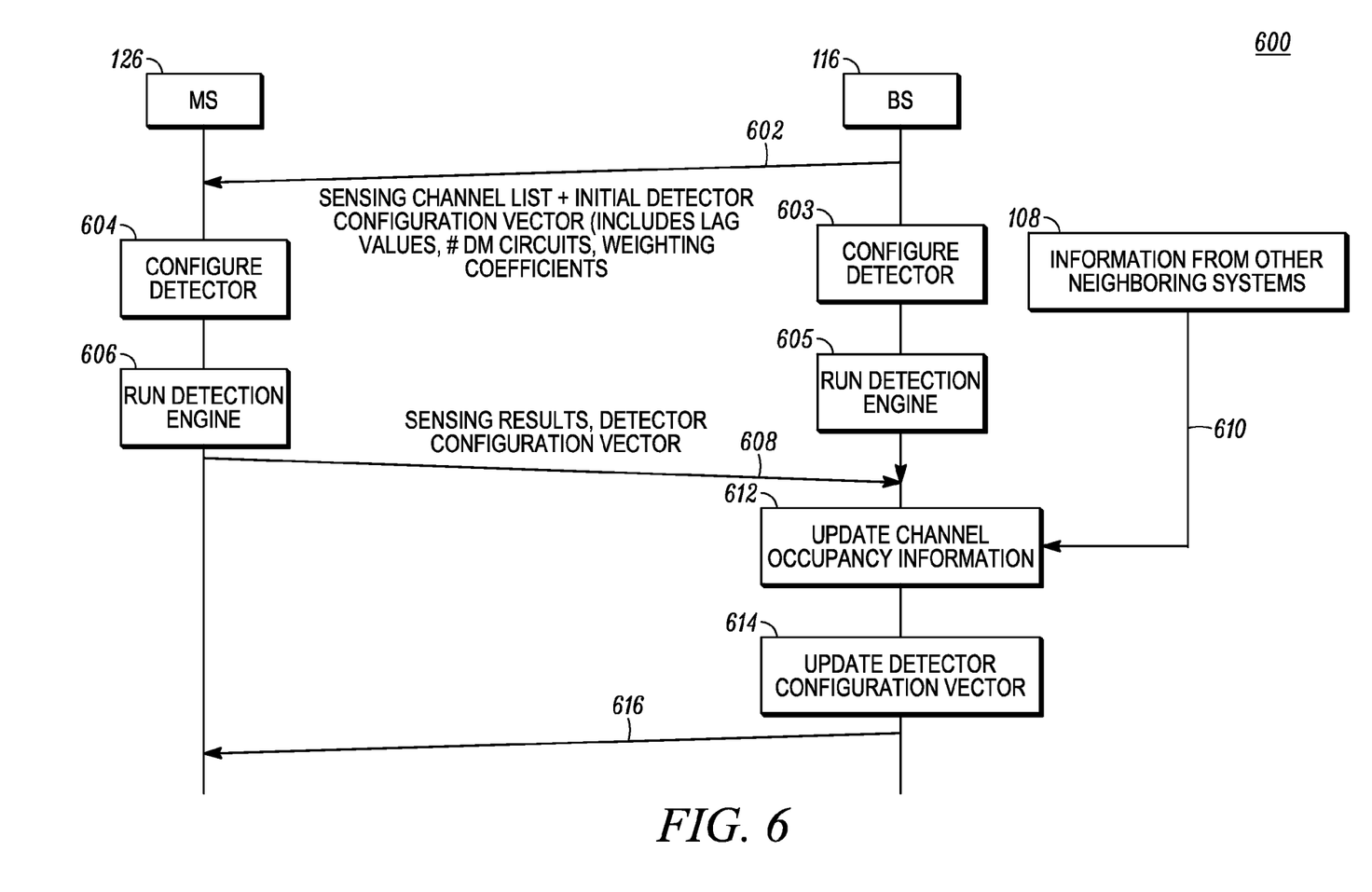
FIG. 6 illustrates a general timeline for establishing characterization of an incumbent system by a CR base station and a CR subscriber to enable spectrum sharing in accordance with another embodiment of the present invention.

In another timeline embodiment shown in FIG. 6, the CR base station 116 senses the frequency spectrum within which it seeks to share spectrum with incumbent systems 102, 104. In this embodiment, the CR subscriber 126, the CR base station 116 and other neighboring CR communication units 118, 128 generate sensing results and detector configuration vector data with which to update channel occupancy information and update detector configuration vector.

The CR base station 116 provides 602 the channel list and initial detector configuration data to CR subscriber unit(s) 126. The CR subscriber unit(s) 126 utilize the channel list and detector configuration vector data to configure 604 the subscriber's internal OFDM detector engine. The subscriber's detection engine is run 606 to determine the presence or absence of an OFDM signal. In parallel with the subscriber 126 configuring its detector 604 and running its internal detection engine, the CR base station 116 configures 603 its own internal detector and runs 605 its own internal detection engine to generate 609 sensing results and detector configuration vector. The CR base 116, in this embodiment, utilizes the combination of sensing results and detector configuration vector 608 from the CR subscriber, the sensing results and detector configuration of the CR base 609 and information from neighboring units 610 (having their own sensing results and detector configuration vectors), to update channel occupancy information 612 and update the CR bases station's detector configuration vector 614. The updated channel occupancy information and updated detector configuration vector is transferred 616 from the CR base station 116 back to the CR subscriber. The CR system is thus characterized with the incumbent system's 102 information. Operation of the CR system within the incumbent's spectrum now takes place without interference.

Figure 4:
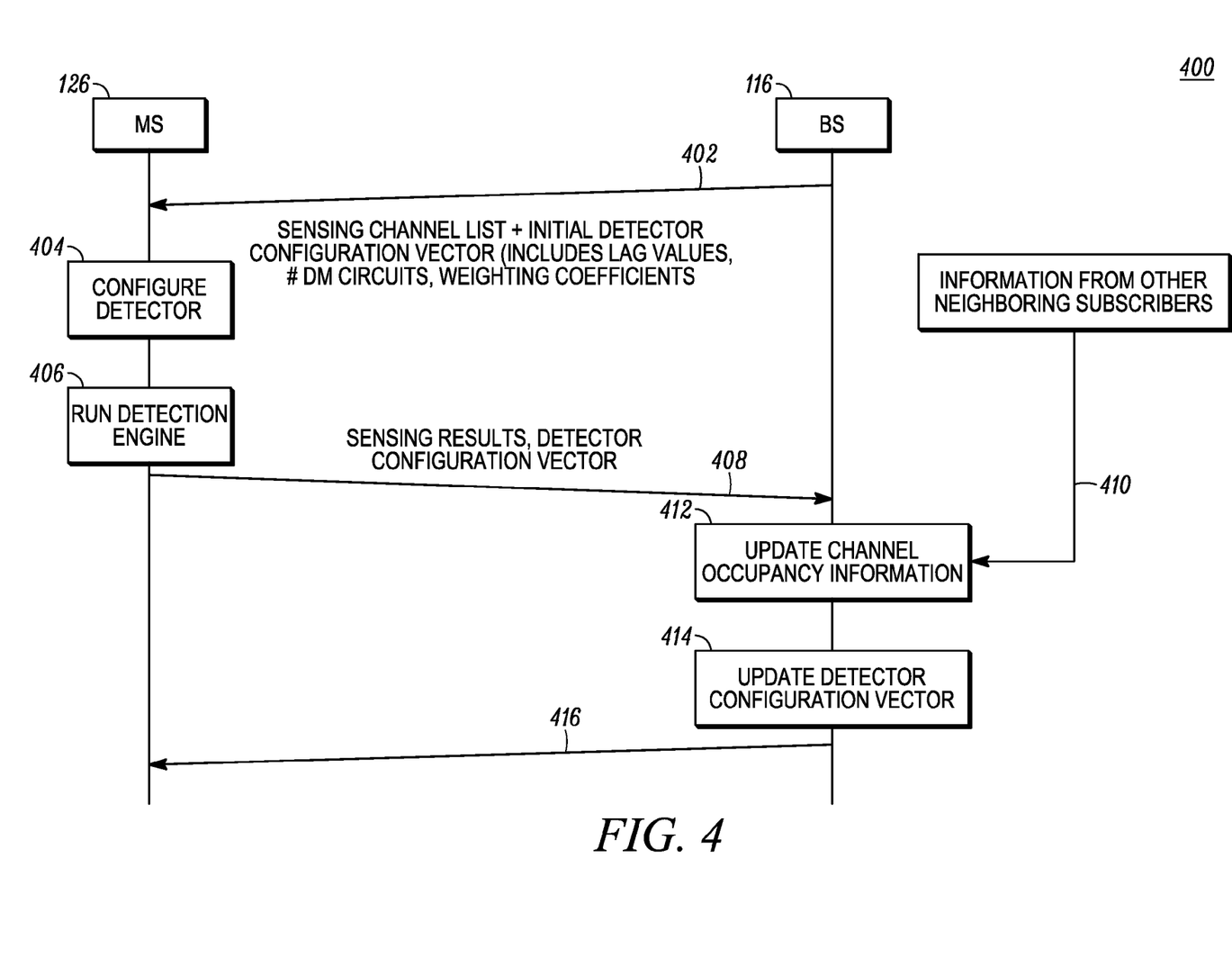
FIG. 4 illustrates a general timeline for establishing characterization of an incumbent system by a CR base station and a CR subscriber to enable spectrum sharing in accordance with an embodiment of the present invention.

The characterization of the incumbent system, as provided by the embodiments of FIGS. 4, 5 and/or FIG. 6 improves CR system operation in the field. This detection approach of the present invention greatly alleviates the incumbent system's interference concerns, and facilitates the adoption of CR system operation within incumbent system frequency spectrum.

Figure 7:
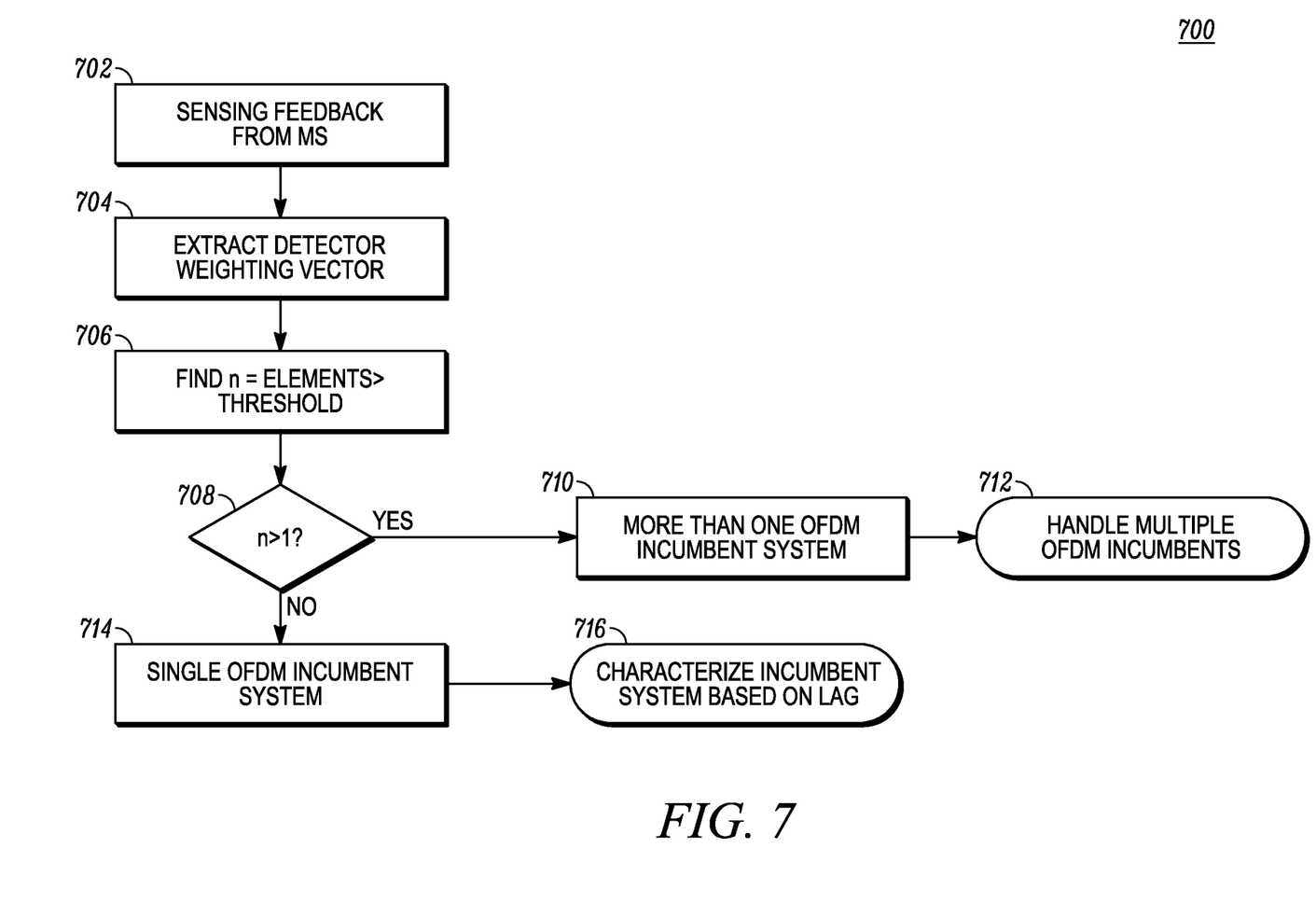
FIG. 7 is a flowchart summarizing a technique for sharing frequency spectrum amongst incumbent and CR communication systems in accordance with some embodiments of the invention.

FIG. 7 illustrates a flowchart summarizing the steps performed by the CR base station 116, in accordance with the various embodiments of FIG. 4, FIG. 5 and FIG. 6. The CR base station 116 receives sensing results at 702. Step 702 can be achieved from any one of the embodiments listed below and as were described in conjunction with FIGS. 4, 5 and 6 and as listed below:

sensing results and detector configuration vector from the CR subscriber in conjunction with other CR units;

internal base station only sensing results in conjunction with other CR units; and a combination of subscriber sensing results and detector configuration vector from both the base and subscriber in conjunction with other CR unit.

The CR base extracts detector weighting (scaling) vector information at 704 and compares each element to a threshold at step 508. If more than one OFDM signal is detected at 708 this is an indication of the presence of more than one OFDM incumbent system at 710. The CR base 116 then proceeds to set up the configuration vectors to handle multiple OFDM incumbents at 712. If only a single OFDM incumbent is present 714 then the base station characterizes the incumbent based on lag at 716.

Accordingly, there has been provided, a method and apparatus which allow a CR system to co-exist in the field with incumbent systems. Alleviating interference in the manner provided by the embodiments of the invention allows efficient reuse of the frequency spectrum. The use of OFDM type signals as a means for identifying incumbents mean that the incumbent may take on a variety of form factors, such as a wireless microphone having a beacon transmitting an OFDM type signal or other compatible digital modulation exhibiting cyclostationary characteristics.

The method and apparatus for alleviating interference between systems sharing frequency spectrum are applicable to any communication systems sharing frequency spectrum. Thus, non-licensed, secondary-licensed, and quasi-licensed systems operating as primary systems can allow access to their spectrum by utilizing the OFDM detection aspect of the invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A system for enabling a plurality of communication systems to share frequency spectrum, comprising:

an incumbent communication system utilizing orthogonal frequency division multiplexing (OFDM); and a cognitive radio (CR) communication system comprising;

a plurality of CR units comprising at least one CR subscriber and at least one CR base station, at least one of the plurality of CR units having an orthogonal frequency division multiplexing (OFDM) detection engine, the OFDM detection engine detecting the presence and absence of OFDM signals within the frequency spectrum and utilizing the detection of the presence of OFDM signals to determine the presence of the incumbent communication system or other CR system operating in a frequency spectrum of interest, the OFDM detection engine receiving and updating a channel list and configuration vector from the at least one CR base station so as not to interfere with the incumbent communication system wherein vector configuration data of the configuration vector comprises:
delay values;
number of delay multiplier (DM) units; and
weighting coefficient data.

2. The CR system of claim 1 wherein the OFDM detection engine comprises:
a plurality of delay multiplier units receiving a digital baseband signal and generating a plurality of delay multiply output signals;
a combiner coupled to the plurality of delay multiplier units for combining the delay multiply output signals into a single stream of data;
a decimator coupled to the combiner for generating a single decimated weighted signal;
a Fast Fourier Transform analyzer coupled to the decimator for generating Fast Fourier Transform (FFT) spectral features of the single weighted signal; and
a detector for detecting the presence of OFDM signal(s) within the spectral features.

3. The CR system of claim 2, wherein the delay multiplier units are configurable.

4. The CR system of claim 3, wherein the delay multiplier units are configurable by the at least one CR base station in response to the information pertaining to incumbent communication devices within the shared spectrum.

5. The CR system of claim 4, wherein the presence of an OFDM signal within the spectral features indicates the presence of an incumbent system within the shared spectrum.

6. The CR system of claim 2, wherein a vector of weighting coefficients is estimated from every delay multiplier unit.

7. The CR system of claim 2, wherein the OFDM detection engine includes a detection weighting coefficient estimation block that suppresses both noise floor and correlated interference when cyclic features of unwanted interference different from that of the signal of interest are present.

8. The CR system of claim 7, wherein non linear transformations of the weighting coefficients exaggerate a feature-to-noise floor ratio parameter.

9. The CR system of claim 6, wherein the converged vector of weighting coefficients is reused by other subscribers.

10. The CR system of claim 6, wherein the at least one CR base station determines the number of incumbent OFDM signals using coefficient vector values.

11. The CR system of claim 2, wherein multiple lags are simultaneously applied to the same digital baseband signal.

12. The CR system of claim 11, wherein the multiple lags are selected based on a priori information regarding the incumbent unit.

13. The CR system of claim 1, wherein the incumbent communication system comprises an 802.11 system operating in television (TV) white space or an 802.22 system operating in TV white space.

14. The CR system of claim 13, wherein delay multiplier units of the CR units are configured based on allowable 802.11 bandwidths or 802.22 bandwidths.

15. The CR system of claim 1, wherein a decision to coexist or override the incumbent is determined based on channel sensing results.

16. The CR system of claim 15, wherein the incumbent utilizes an OFDM signal or other compatible digital modulations.

17. The CR system of claim 2, wherein the delay multiplier units are configured based on allowable OFDM bandwidths of other systems.

18. A method of sharing frequency spectrum amongst communication systems, comprising: at a cognitive radio (CR) communication unit
receiving a radio frequency (RF) signal from a cognitive radio (CR) base station;
processing the RF signal to generate an intermediate frequency (IF) signal;
filtering the IF signal for noise to generate a baseband signal;
digitizing the baseband signal;
applying the digitized baseband signal to a parallel array of delay multiplier units to generate delay multiply output signals;
processing the multiple stream of delay multiply output signals through an adaptive weighted combining block to generate a single weighted data stream;
estimating the weighting coefficients adaptively on sample-by-sample basis;
decimating the single weighted data stream to generate a decimated signal;
applying Fast Fourier Transform (FFT) to the decimated signal to reveal spectral features within the decimated signal;
determining the presence of OFDM signal(s) within the spectral features and utilizing the determination of the presence of OFDM signal(s) to indicate the presence of an incumbent unit operating within the frequency spectrum and
receiving and updating a channel list and configuration vector provided from the CR base station in response to detecting an OFDM signal to enable sharing of the frequency spectrum, wherein configuring is based on vector configuration data comprising:
delay values;
number of delay multiplier (DM) units; and
weighting coefficient data.

19. The method of claim 18, wherein the parallel array of multipliers is controlled by a base station of a CR system, the base station configuring the number delay multiplier units and amount of each delay.

20. A cognitive radio (CR) communication unit operating within an incumbent spectrum, the CR communication unit comprising:
an orthogonal frequency division multiplexer (OFDM) detector;
radio frequency (RF) processing circuits for sensing a radio frequency (RF) signal and converting it to an intermediate frequency (IF) signal;
an IF processing circuit for receiving the intermediate frequency (IF) signal and converting it to a baseband signal;
analog-to-digital converter for converting the baseband signal to a digital signal;
a plurality of delay multipliers simultaneously receiving the digital signal and generating multiple data streams characterized by different delays;
a combiner for estimating weighting vector coefficients for every delay multiplier stream and using the estimated vector coefficients to produce a single data stream;
a decimator lowering the rate of the single data stream in a decimated signal;
a Fast Fourier Transform analyzer for transforming the decimated signal into a spectral output; and
a logic circuit for determining the presence of an orthogonal frequency division multiplexing (OFDM) signal within the spectral output and utilizing the determination of the presence of the OFDM signal to indicate the presence of an incumbent unit operating within the spectral output wherein the OFDM detector is configured for receiving and updating a channel list and configuration vector from a CR base station so as not to interfere with an incumbent communication system, wherein the vector configuration comprises:

lag values, the number of delay multiplier (DM) circuits and weighting coefficients.

* * * * *